(No Model.)

E. A. DANIEL.
COMBINED CHOPPER AND CULTIVATOR.

No. 287,251. Patented Oct. 23, 1883.

WITNESSES:

INVENTOR:
E. A. Daniel
BY Munn & Co
ATTORNEYS.

UNITED STATES PATENT OFFICE.

ELLISON A. DANIEL, OF BLUFF MILLS, TEXAS.

COMBINED CHOPPER AND CULTIVATOR.

SPECIFICATION forming part of Letters Patent No. 287,251, dated October 23, 1883.

Application filed April 28, 1883. (No model.)

*To all whom it may concern:*

Be it known that I, ELLISON ARMISTEAD DANIEL, of Bluff Mills, in the county of Johnson and State of Texas, have invented a new and Improved Combined Chopper and Cultivator, of which the following is a full, clear, and exact description.

This invention pertains to improvements in machines for chopping and cultivating cotton and other plants; and it consists of the combination and arrangement of parts, substantially as hereinafter fully set forth and claimed.

Reference is to be had to the accompanying drawings, forming part of this specification, in which similar letters of reference indicate corresponding parts in all the figures.

Figure 1:
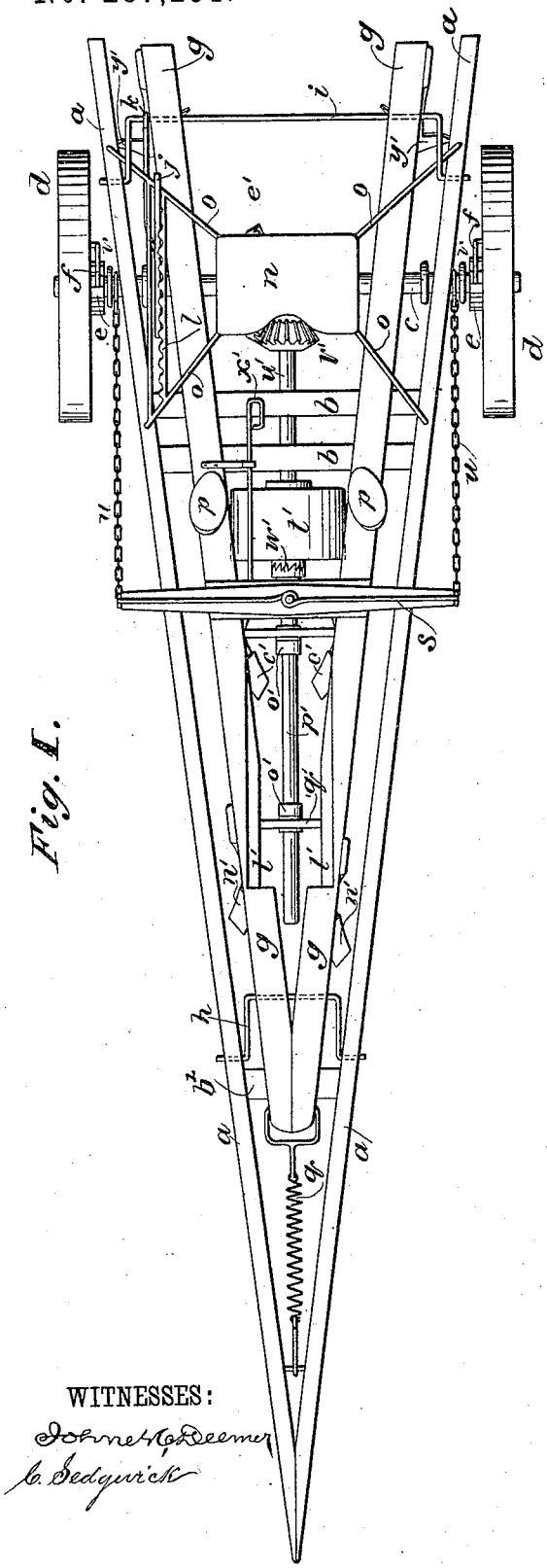
Figure 2:
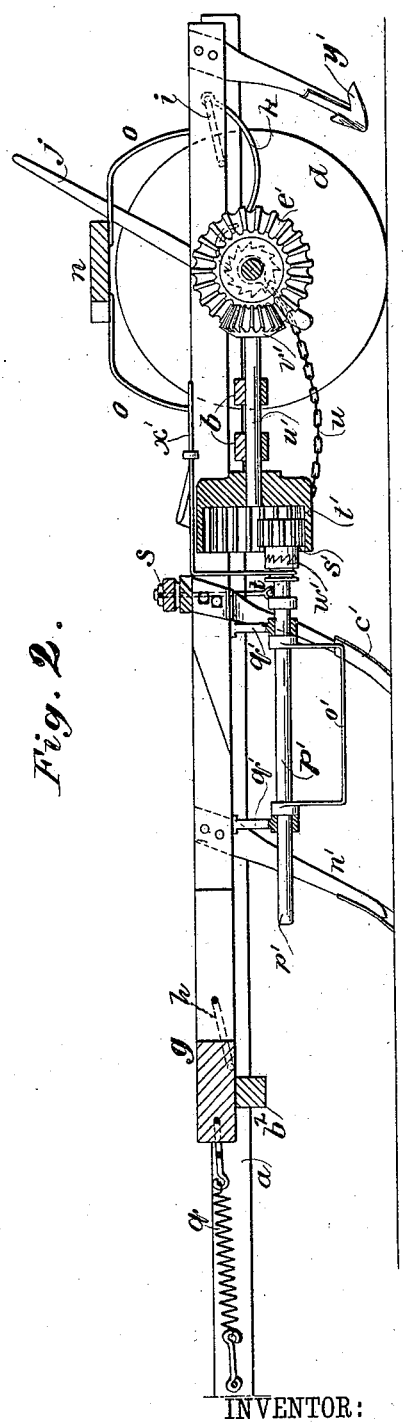

Figure 1 is a plan view of my improved chopper and cultivator, and Fig. 2 is a longitudinal section of Fig. 1.

The truck consists of the two side bars, $a$, arranged in ∧ shape and connected together by the cross-bars $b$ and $b^2$, and also connected to the truck-axle $c$, which is mounted on the two wheels $d$, which are connected to it by the ratchets $e$ and pawls $f$, by which they cause the shaft to revolve when going ahead, but are free to turn backward independently of the shaft, or to allow the shaft to overrun one when turning around curves, where one wheel turns faster than the other. The bar $b^2$ is to keep the plows from dipping in front and to hold the plow-frame $g$ above level, so the said plow-frame can be raised without difficulty.

The frame for carrying the plows and other attachments consists of the two side bars, $g$, also connected together in ∧ shape, but of smaller dimensions than the truck-frame, to be located inside of it, and frame $g$ is mounted on the crank-shafts $h$ and $i$, that are supported in frame $a$, so as to be raised and lowered by swinging up and down on the cranks, which are operated by the lever $j$, pivoted on the axle and connected to crank $i$ by rod $k$, a holding-rack, $l$, being provided in connection with said lever, so that it can be set to maintain the frame $g$ at any required height to regulate the depth of the plows in the ground, or to hold them entirely above the ground for being carried above it.

The driver sits on a seat, $n$, supported on frame $a$ by the rods $o$ in suitable proximity to the lever $j$, for working it from his seat, and the frame $g$ has foot-pieces $p$, by which it is designed that the driver shall be enabled to control the plows with relation to the plants by pushing the plow-frame laterally on the cranks $h$ $i$ to some extent, the frame being designed to have lateral play thereon, so that in case the rows of plants are not exactly straight, or if the truck diverges too much either way from the line of the plants, he can protect the plants from injury by the plows. By the same device the driver is also enabled to shift the plow-frame directly forward or backward, to raise or lower the plows, as may be required from time to time, and the plow-frame is connected to the truck-frame at the front end by a coiled spring, $q$, which facilitates the forward thrust of the frame by the feet.

The evener $s$, to the ends of which the whiffletrees are to be attached for hitching on the horses, is pivoted on the plow-frame, and has an arm, $t$, at each end extending down to about the level of the axle, when the plow-frame is raised upon the cranks and is connected with the axle by a chain, $u$, and a ring, $v$, so that the pull of the horses is directly on the axle when the machine is being drawn along the ground with the plows out of action.

$n'$ $n'$ are the front plows for barring off, and $o'$ is the chopper, which consists of a blade mounted on a shaft, $p'$, that is arranged in the longitudinal axis of the machine on brackets $q'$, and being geared by a pinion, $s'$, with an internally-geared wheel, $t'$, on a shaft, $u'$, mounted in the cross-bars $b$, and gearing with the driver $e'$ by a pinion, $v'$, the chopper-shaft being connected to its pinion $s'$ by a clutch, $w'$, to be worked by a handle, $x'$. This chopper-blade may be arranged parallel to the shaft or spirally or diagonally to it, as may be desired, and it will be geared at the proper speed for chopping out as close together or wide apart as may be desired.

$c'$ $c'$ are additional plows arranged behind the chopper to throw up fresh earth to the plants after the chopper, and the sweeps $y'$ behind sweep up the earth from the middle space between the rows, or thereabout.

When the chopper-shaft $p'$ is geared with the internal wheel, $t'$, as above described, it disconnects therefrom whenever the frame $g$ is raised on the cranks $h\ i$, the clutch $w'$ being only required when the chopper is to be disconnected without raising said frame.

Having thus fully described my invention, I claim as new and desire to secure by Letters Patent—

1. The combination, in a chopper and cultivator, of the ∧-shaped frame $g$, carrying the plows, chopper, and the ∧-shaped truck-frame $a$, said frame $g$ being mounted on the truck-frame by the cranks $h$ and $i$, and provided with means for raising and lowering it, substantially as described.

2. The frame $g$, mounted on the cranks $h\ i$ of the truck-frame suitably for having lateral movements on said cranks, and being connected to frame $a$ by the spring $q$, substantially as described.

3. The combination of the frame $g$, having foot-pieces $p$, with frame $a$, and being connected to said frame $a$ by the cranks $h\ i$ and spring $q$, said frame $a$ having a driver's seat, $n$, arranged with relation to said foot-pieces $p$, substantially as described.

4. The combination, in a chopping and cultivating machine, of the truck-frame $a$, chopper, and cultivator, carrying frame $g$, cranks $h\ i$, spring $q$, lever $j$, connecting-rod $k$, and the holding-rack $l$, substantially as described.

5. The ∧-shaped frames $a$ and $g$, truck-wheels $d$, axle $c$, and driving-wheel $e'$, in combination, and being arranged for the application of a chopper attachment in advance of the axle and in the longitudinal axis of said frames, substantially as described.

ELLISON A. DANIEL.

Witnesses:
  M. S. GRIER,
  R. S. PORTER.